US012637167B2

(12) United States Patent
Chalmers

(10) Patent No.: US 12,637,167 B2
(45) Date of Patent: May 26, 2026

(54) LEVER ACTUATOR

(71) Applicant: Fox Factory, Inc., Duluth, GA (US)

(72) Inventor: Douglas Alexander Chalmers, Vancouver (CA)

(73) Assignee: Fox Factory, Inc.

( * ) Notice: Subject to any disclaimer, the term of this patent is extended or adjusted under 35 U.S.C. 154(b) by 0 days.

(21) Appl. No.: 18/804,967

(22) Filed: Aug. 14, 2024

(65) Prior Publication Data

US 2025/0368290 A1     Dec. 4, 2025

Related U.S. Application Data

(60) Provisional application No. 63/655,343, filed on Jun. 3, 2024.

(51) Int. Cl.
*B62K 23/06*          (2006.01)
*B62K 25/04*          (2006.01)

(52) U.S. Cl.
CPC ........ *B62K 23/06* (2013.01); *B62K 2025/048* (2013.01)

(58) Field of Classification Search
CPC ................................................ B62K 2025/048
See application file for complete search history.

(56) References Cited

U.S. PATENT DOCUMENTS 2,707,926 A  *  5/1955  Haas ...................... D05B 47/00
                                                              112/59
5,479,776 A     1/1996  Romano

| | | |
|---|---|---|
| 7,650,813 B2 | 1/2010 | Tsumiyama |
| 8,096,208 B2 | 1/2012 | Sean |
| 8,397,601 B2 | 3/2013 | Fukao |
| 8,490,995 B2 | 7/2013 | Hunt et al. |
| 8,833,200 B2 | 9/2014 | Hunt et al. |
| 9,594,393 B2 | 3/2017 | Kosaka et al. |
| 10,442,499 B2 | 10/2019 | Marangon |

(Continued)

FOREIGN PATENT DOCUMENTS

| DE | 1028005 B | 4/1958 |
|---|---|---|
| EP | 0659964 A1 | 6/1995 |

(Continued)

OTHER PUBLICATIONS

Bontrager Droplock Remote, Trek Bikes, https://www.trekbikes.com/ca/en_CA/equipment/cycling-components/bike-seatposts-accessories/bike-seatpost-parts-accessories/bontrager-droplock-remote/p/33107/ (Alleged Publication: Unknown) (Last Visited: Sep. 18, 2024).

(Continued)

*Primary Examiner* — Vicky A Johnson
(74) *Attorney, Agent, or Firm* — Perilla Knox & Hildebrandt LLP; Kenneth A. Knox

(57)                    ABSTRACT

A lever actuator is described that includes: a frame; a lever movably coupled to the frame, the lever comprising a contact portion; a multi-position track disposed in one of the lever and the frame, the multi-position track being continuous and comprising a plurality of ledges defining a plurality of discrete track positions; and a follower arm coupled to the frame and the lever by way of a track pin. The track pin is movable within the multi-position track. A force applied to the contact portion of the lever causes the track pin to advance among a respective one of the ledges to a subsequent discrete track position in a first direction.

20 Claims, 11 Drawing Sheets

(56) References Cited

U.S. PATENT DOCUMENTS

| | | | | |
|---|---|---|---|---|
| 11,072,392 | B2 | 7/2021 | Kawakami | |
| 2005/0193856 | A1 | 9/2005 | Dal Pra et al. | |
| 2018/0009501 | A1* | 1/2018 | Chang | B62L 3/08 |
| 2018/0009506 | A1* | 1/2018 | Minto | F16C 1/12 |
| 2020/0307376 | A1* | 10/2020 | Hetu | F16H 21/44 |

FOREIGN PATENT DOCUMENTS

| | | | | | |
|---|---|---|---|---|---|
| EP | 1922244 | B1 | | 12/2011 | |
| EP | 3266695 | B1 | | 5/2019 | |
| EP | 4053006 | A1 | * | 9/2022 | B62K 23/06 |
| TW | I243779 | B | | 11/2005 | |
| TW | I572515 | B | | 3/2017 | |

OTHER PUBLICATIONS

Review: Bontrager Droplock Remote, Feed The Habit, https://www.feedthehabit.com/bontrager-droplock-review/ (Alleged Publication: Oct. 20, 2020) (Last Visited: Sep. 18, 2024).
Search Report for UK Patent Application No. 2415849.5 of Mar. 27, 2025.
First Office Action for DE Patent Application No. 102024134811.9 of Mar. 28, 2025 (Machine Translation Attached).
First Office Action for TW Patent Application No. 113145635 of Aug. 8, 2025.

\* cited by examiner

100

131

109

112

103

118

115

106

A₁

100

131

103

109

112

115

120

118

106

100

106

109

112

115

103

LEVER ACTUATOR

CROSS-REFERENCE TO RELATED APPLICATION

This application claims the benefit of and priority to U.S. Provisional Patent Application No. 63/655,343 filed Jun. 3, 2024, entitled "LEVER ACTUATOR," the contents of which being incorporated by reference in their entirety herein.

TECHNICAL FIELD

The present disclosure relates to lever actuators for implementation in suspension control systems, among other applications.

BACKGROUND

Various suspension control mechanisms exist for bicycles that can be adjusted to change characteristics of a suspension system of the bicycle. For instance, a rider of a bicycle can interact with a suspension to toggle the bicycle between a first suspension setting or a second suspension setting based on a wide range of riding styles and decisions, such as terrain, incline, and so forth. Some bicycle suspension system mechanisms include hand-adjustable suspension controllers which are able for manipulation by the rider, for instance, to toggle the suspension between the different suspension settings. These suspension controllers can be coupled to a handlebar and include a lever that can be multi-directionally adjusted using a thumb or other finger of a rider to toggle the suspension of the bicycle.

BRIEF SUMMARY

According to an aspect of the present disclosure, a lever actuator is provided. The lever actuator includes a frame and a lever movably coupled to the frame. The lever can include a contact portion. The lever actuator further includes a multi-position track disposed in or on one of the lever and the frame. The multi-position track is continuous and comprises ramps and ledges defining discrete track positions. The lever actuator further includes a follower portion (e.g., a follower arm) coupled to the frame and the lever by way of a track pin, wherein the track pin is movable within the multi-position track. A force applied to the contact portion of the lever causes the track pin to advance among a respective one of the ledges to a subsequent discrete track position along a path direction.

According to various aspects of the present disclosure, the lever actuator may include a biasing element for the track pin that applies force in a Z direction perpendicular to a plane (or a planar surface) of the multi-position track. The biasing element may be a spring or a cantilevered, spring steel member, or any force imposing mechanism capable of applying force to the track pin. The multi-position track may further include ramps positioned between the ledges, and may be recessed in the frame or the lever. Cable tension may pull the track pin in a second direction opposite that of a first direction. For instance, the cable tension can pull the track pin in a direction opposite that of a movement direction of the contact portion of the lever. A first end of the multi-position track may be coupled to a second end of the multi-position track. The multi-position track may include at least a first loop and a second loop. Individual ramps of a first subset of the ramps may have a ramp length that is less than that of individual ramps of a second subset of the ramps.

A first amount of displacement of the lever may be provided to advance the track pin between a first one of the discrete track positions and a second one of the track positions, and a second amount of displacement of the lever may be provided to advance the track pin between a third one of the discrete track positions and the first one of the discrete track positions. The second amount of displacement of the lever is less than the first amount of displacement, for example.

According to another aspect of the present disclosure, a lever actuator is provided having a unidirectional lever. The lever actuator includes a static portion and a dynamic portion movably coupled to the static portion. The lever actuator also includes a multi-position track disposed in one of the static portion and the dynamic portion. The multi-position track is continuous and comprises a plurality of ledges defining a plurality of discrete track positions. The lever actuator further includes a track pin movable within and biased against the multi-position track. In some scenarios, a first amount of displacement caused by manipulation of the dynamic portion causes the track pin to move to a successive one of the discrete track positions, and a second amount of displacement caused by manipulation of the dynamic portion causes the track pin to move to a preceding one of the discrete track positions.

According to various aspects of the present disclosure, the static portion may be a frame and the dynamic portion may be a lever, and the lever actuator may further comprise a follower arm coupled to the frame and the lever by way of the track pin. The lever actuator may include a biasing element for the track pin that biases the track pin in a Z direction perpendicular to the plane of the multi-position track. The biasing element may be a spring in some aspects. The multi-position track may further comprise ramps positioned between the ledges. The multi-position track may be recessed in the static portion or the dynamic portion. The static portion may be a frame, and the dynamic portion may be a lever. Cable tension may bias the track pin in a second direction opposite that of the first direction. A first end of the multi-position track may be coupled to a second end. The plurality of ledges may be configured to prevent movement of the track pin in a second direction opposite that of the first direction. The number of the discrete track positions may be three, four, five, or more. Individual ramps of a first subset of the ramps may have a ramp length that is less than that of individual ramps of a second subset of the ramps. The lever actuator may be part of a handlebar of a bicycle, a dirt bike, a motorcycle, a powered vehicle, etc.

According to yet another aspect of the present disclosure, a method is provided that includes providing the lever actuator of any of the aforementioned aspects.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
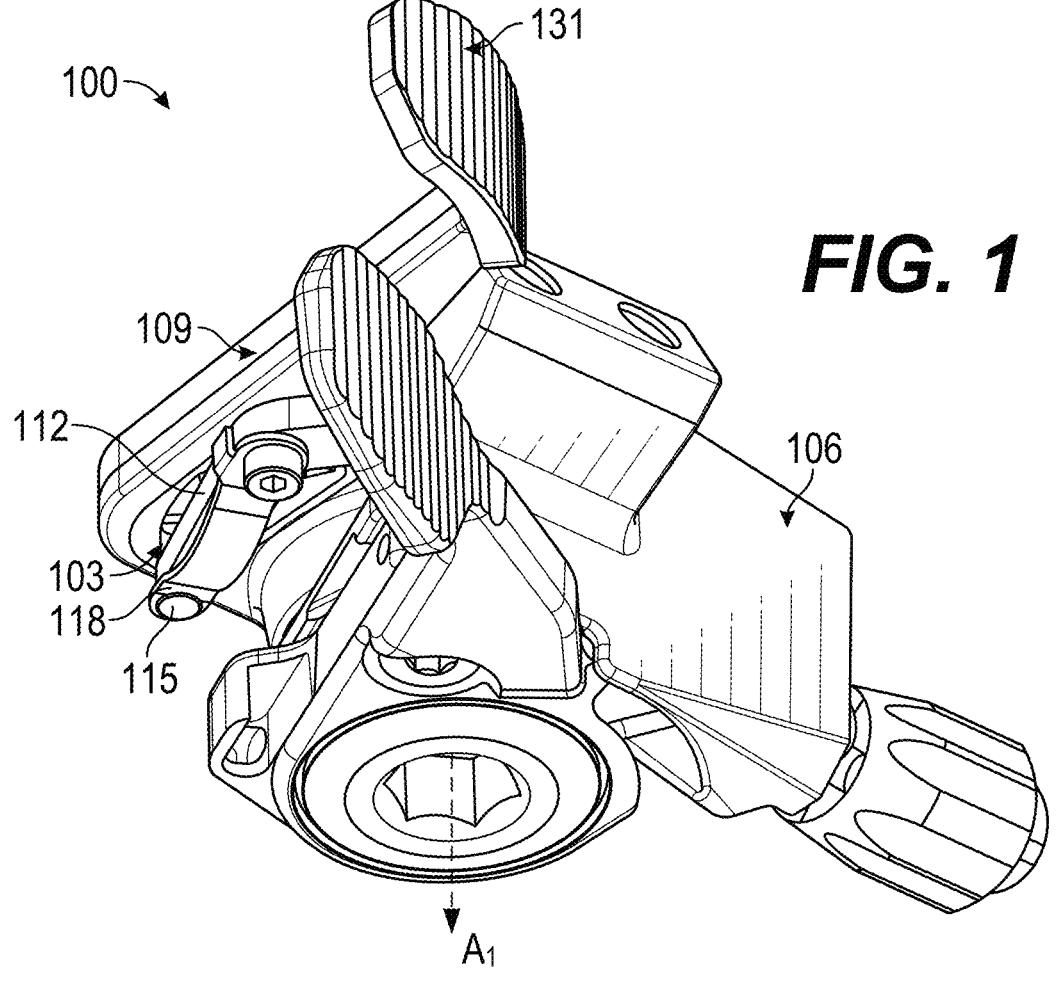
FIG. 1 is a perspective view of a lever actuator according to various embodiments of the present disclosure.

The present disclosure relates to a lever actuator that can be implemented in suspension systems, gear systems, and other like mechanical systems to actuate a fork, shock, gear, or other mechanical component. As previously noted, some suspension systems on bicycles and like vehicles include a hand-adjustable suspension controller. A rider of a bicycle or other operator can flick a lever using a thumb or an index finger to interact with the suspension controller, for instance, to toggle the suspension between different predefined suspension settings. The suspension controller may be multi-directional, requiring the lever to be pushed forwards (away from the rider) or pulled backwards (towards the rider) to toggle between suspension settings. The suspension controller may also feature two separate actuators to either engage or disengage the suspension settings respectively. Suspension controllers that require the lever to be pulled in a multitude of different directions or that feature multiple actuators can be less desirable as, during strenuous activity, races, and the like, it can be difficult to adjust suspension settings in real-time without stopping or hindering speed. There is also limited room around the handlebar area where, where the controller must compete with brake levers, seat-post height adjusters and the like. As such, in some scenarios, suspension controllers that toggle suspension settings while manipulating a single lever in a common direction (e.g., only frontwards, only rearwards, etc.) can be desirable.

The present disclosure relates to a lever actuator that can be used in suspension systems to continuously and sequentially toggle between various suspension settings by manipulating a lever or like device in a common direction (e.g., a forward direction, a rearward direction, a lateral direction, and so forth). For instance, sequential manipulations of a lever in a same direction can iterate through a multitude of predefined suspension settings, gear settings, or other settings, as will be described.

Thus, according to various embodiments, a lever actuator is described that includes a static portion (e.g., a frame), a dynamic portion (e.g., a lever) movably coupled to the static portion, and a multi-position track disposed in one of the static and dynamic portions. The multi-position track can include a continuous channel formed up of ramps and ledges. The continuous channel can include a multitude of discrete track positions or, in other words, points of equilibrium for a track pin. A follower arm is coupled to the frame and the lever by way of the track pin, where the track pin is movable within the multi-position track. When a force is applied to the contact portion of the dynamic portion, the track pin advances among a respective one of the ledges to a subsequent discrete track position in a continuous channel direction. The lever actuator can be implemented in a suspension controller or like system to cycle through various suspension settings while manipulation of the lever in a same direction can be maintained.

Figure 2A:
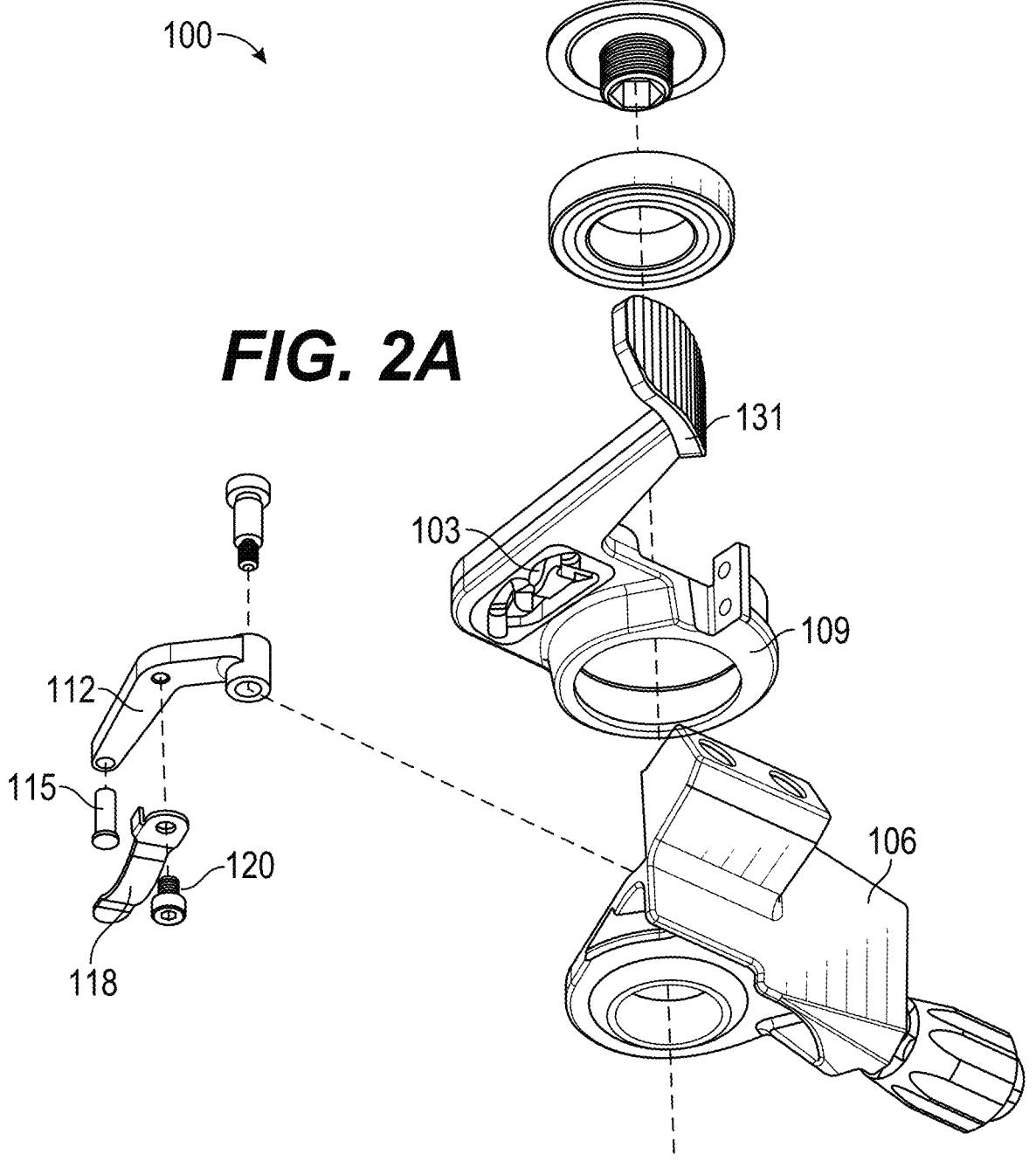
FIG. 2A is an exploded view of the lever actuator of FIG. 1 according to various embodiments of the present disclosure.
Figure 2B:
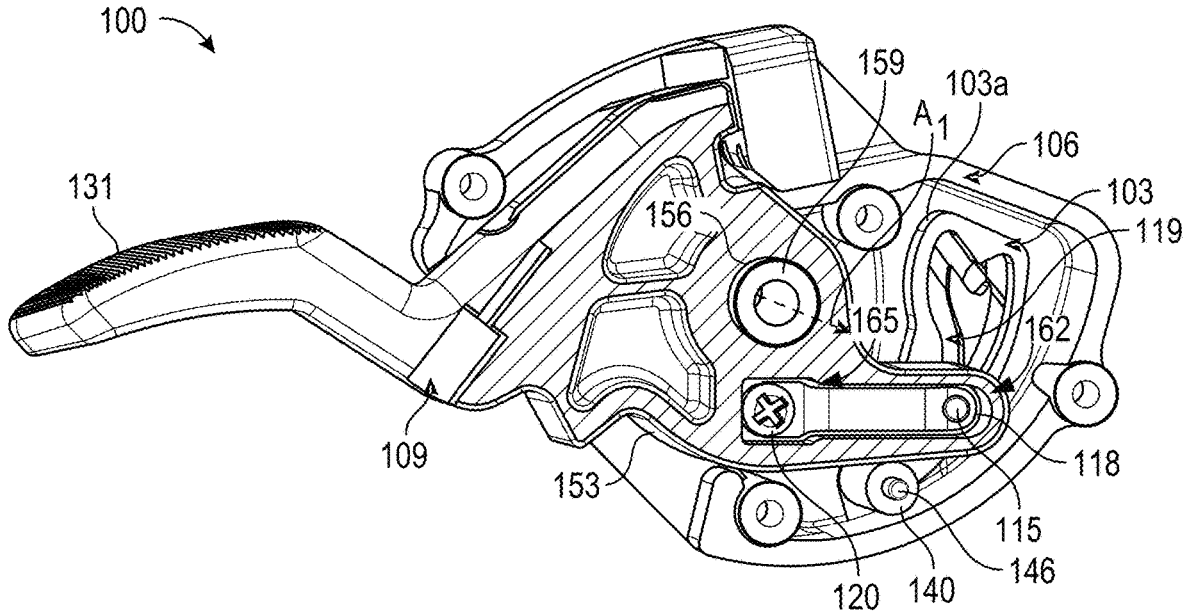
FIG. 2B is a cross-sectional view of the lever actuator of FIG. 1 according to various embodiments of the present disclosure.
Figure 3:
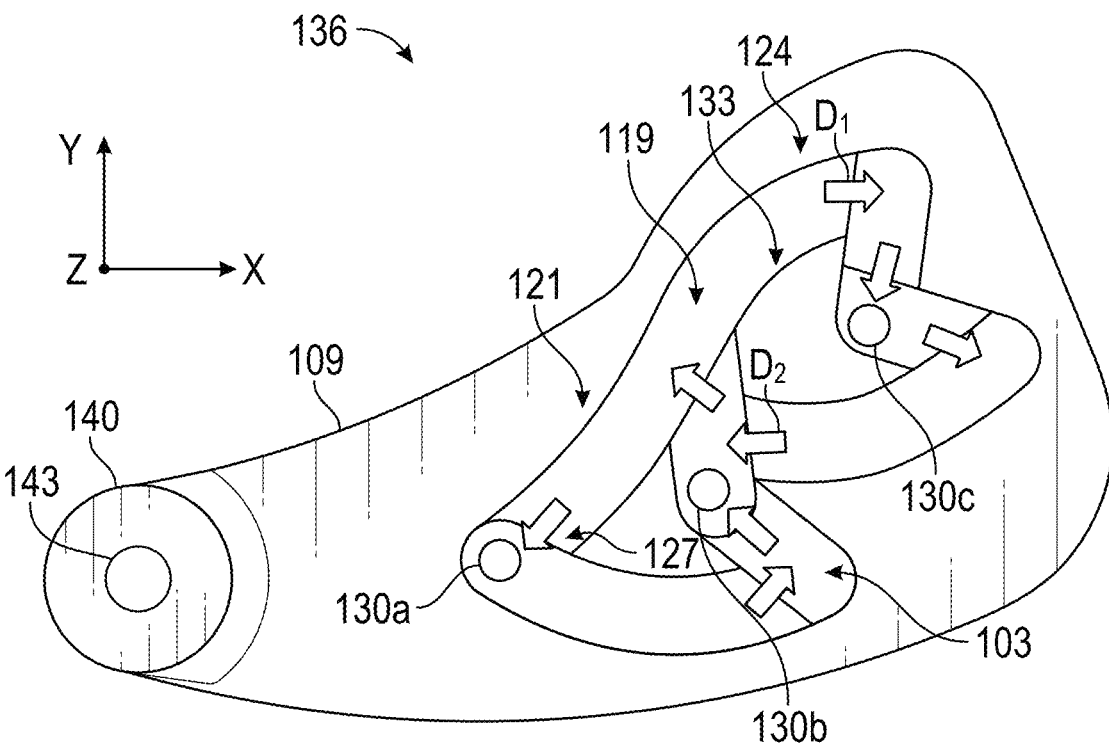
FIG. 3 is a side view of a portion of the lever actuator of FIG. 1 illustrating a track according to various embodiments of the present disclosure.
Figure 4:
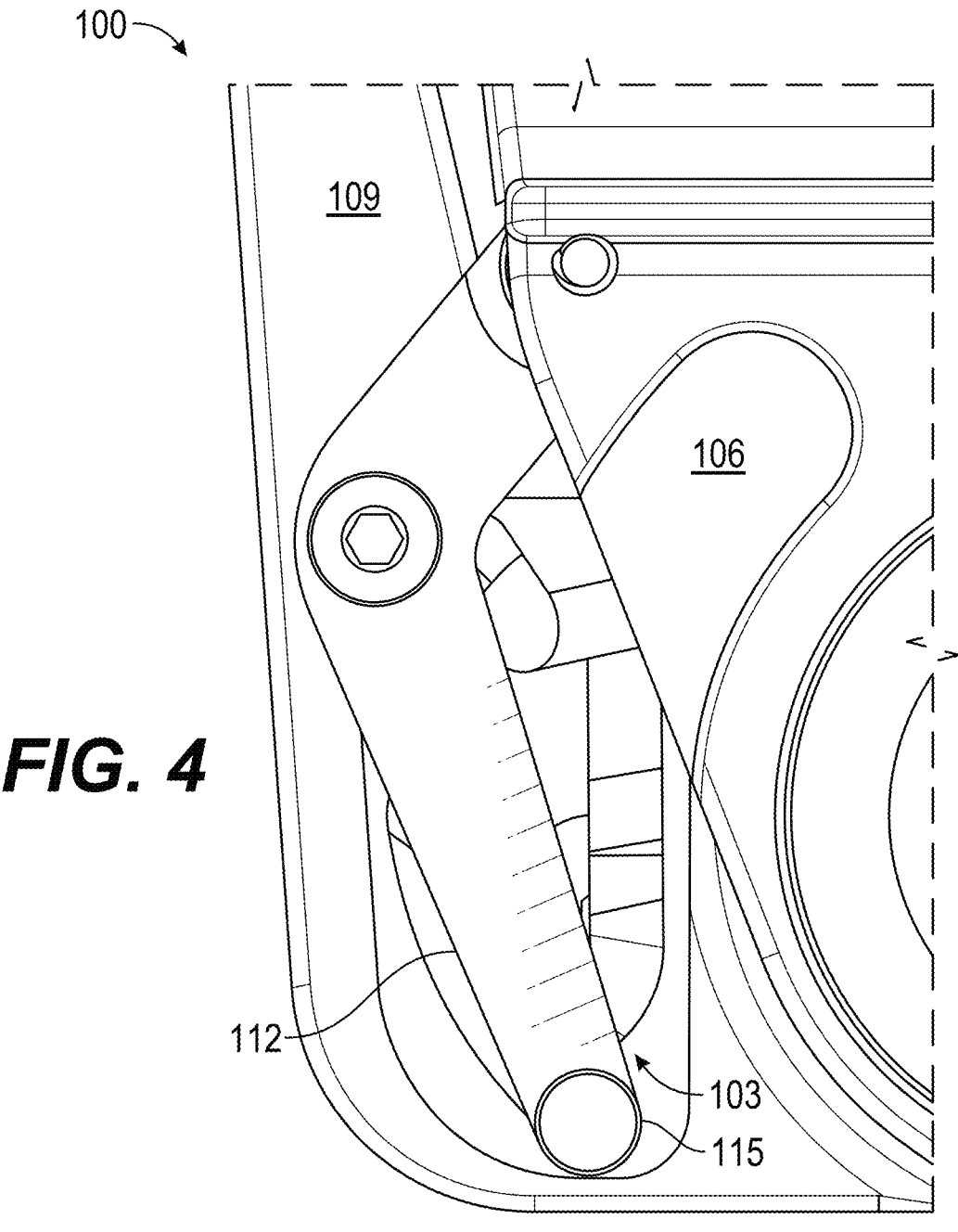
FIGS. 4-6 are side views of the lever actuator according to various embodiments of the present disclosure.
Figure 5:
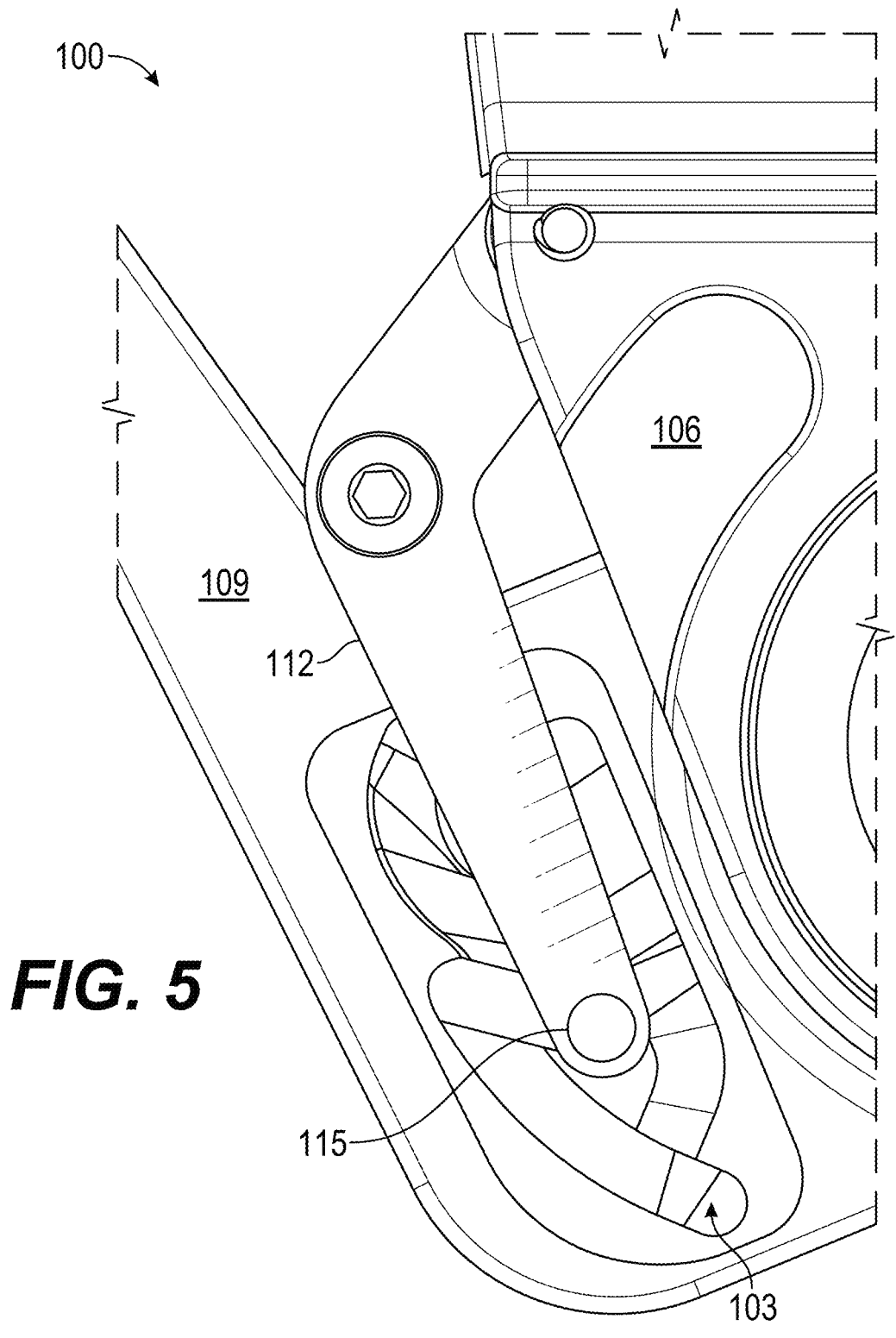
Figure 6:
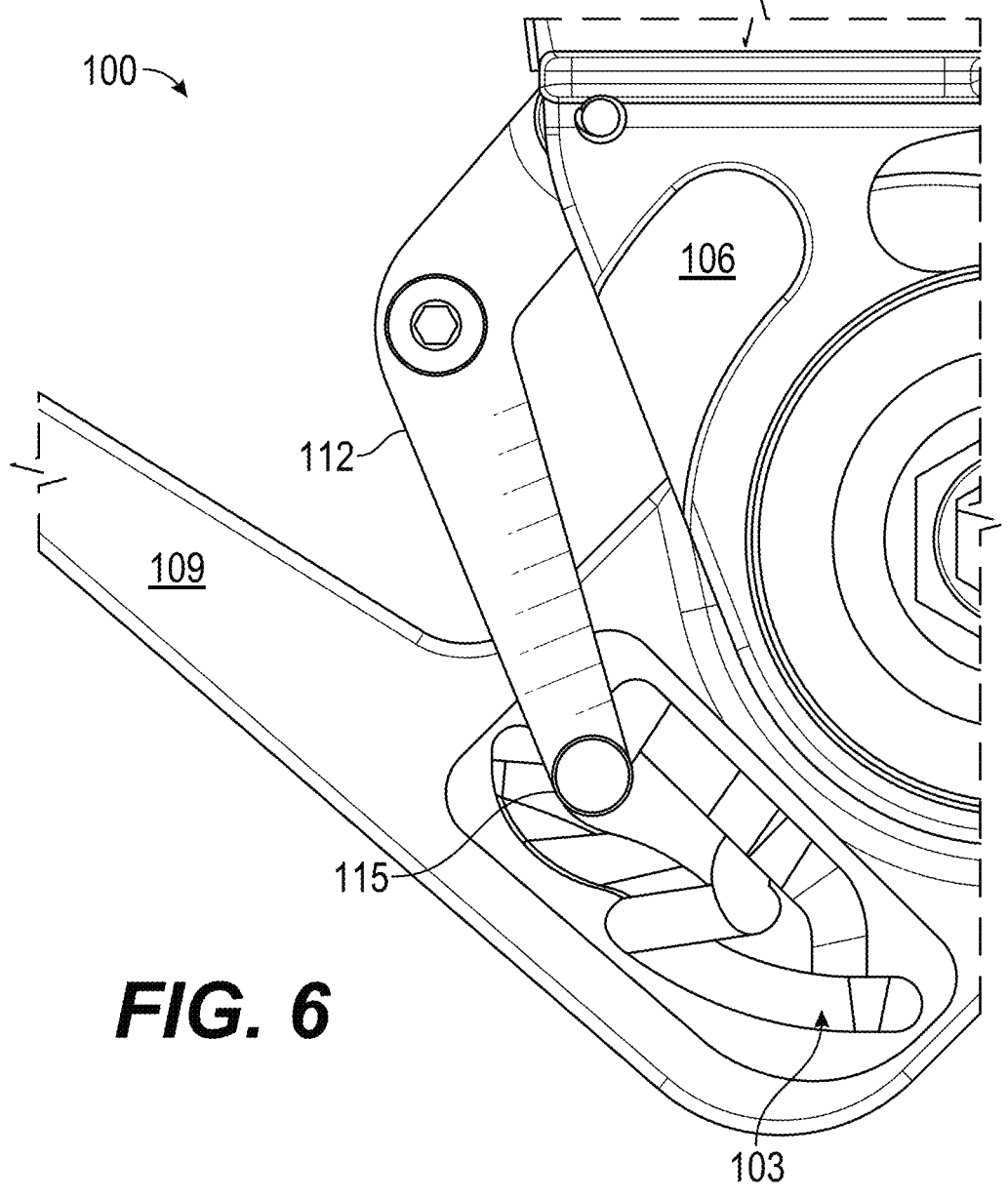
Figure 7:
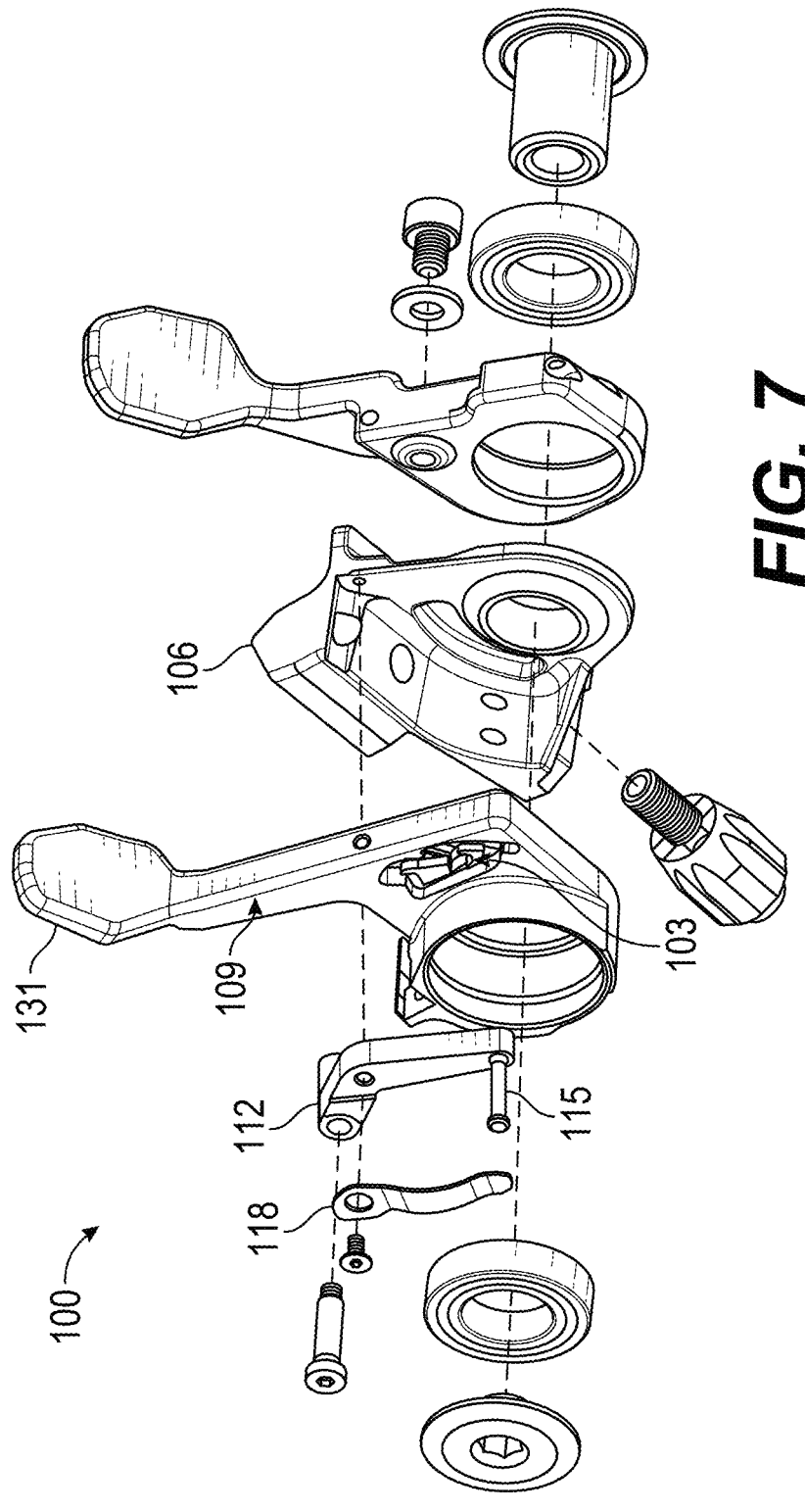
FIGS. 7 and 8 are additional exploded views of the lever actuator of FIG. 1 according to various embodiments of the present disclosure.
Figure 8:
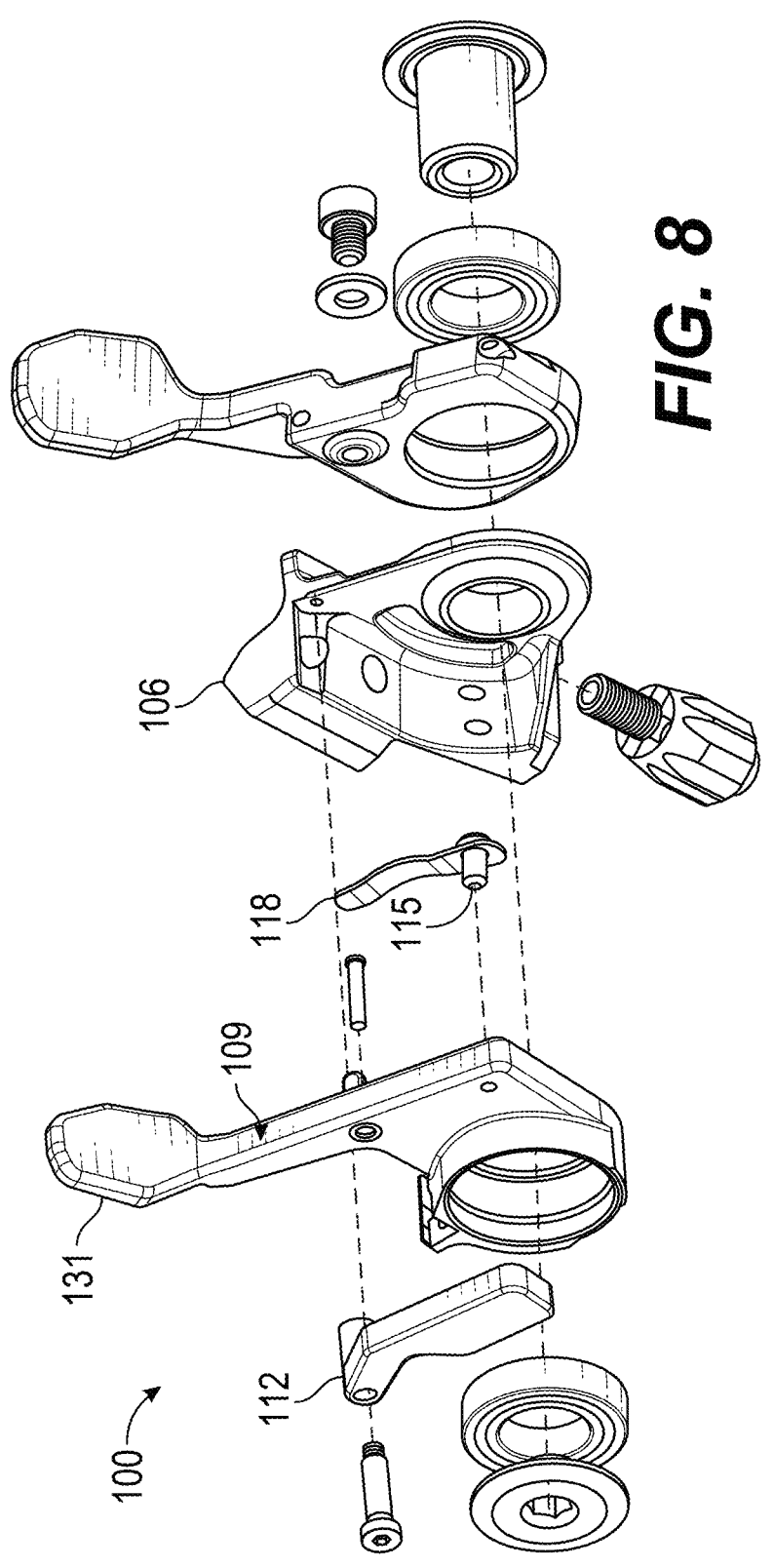

Turning now to the drawings, FIG. 1 is a perspective view of a lever actuator 100, FIG. 2A is an exploded view of the lever actuator 100, and FIG. 2B is a cross-sectional view of the lever actuator 100 according to various embodiments of the present disclosure. FIG. 3 is a side view of a portion of the lever actuator 100 illustrating a multi-position track 103 according to various embodiments of the present disclosure. FIGS. 4-6 are side views of the lever actuator 100, and FIGS. 7 and 8 are additional exploded views of alternative embodiments of the lever actuator 100 according to various embodiments of the present disclosure.

Referring to FIGS. 1-8 collectively, the lever actuator 100 may include the multi-position track 103, a static portion, and a dynamic portion. The static portion may include a fixed portion of the lever actuator 100 and, as such, the static portion may be fixed relative to a bicycle or like vehicle. Conversely, the dynamic portion may include a portion that is movable with respect to the static portion. In various embodiments, the static portion is a frame 106 and the dynamic portion is a lever 109, although the disclosure is not so limited. It is understood that the lever 109, or a portion thereof, can be replaced with a button or like mechanical device without deviating from the aspects of the present disclosure.

In some embodiments, the lever 109 is movably coupled to the frame 106. For instance, the lever 109 can be configured to pivot or rotate about a pivot point on the frame 106. While the embodiments shown in FIGS. 1, 7, and 8 include two levers disposed on opposite sides of the frame 106, other examples of the lever actuator 100 include a single lever 109.

Figure 10:
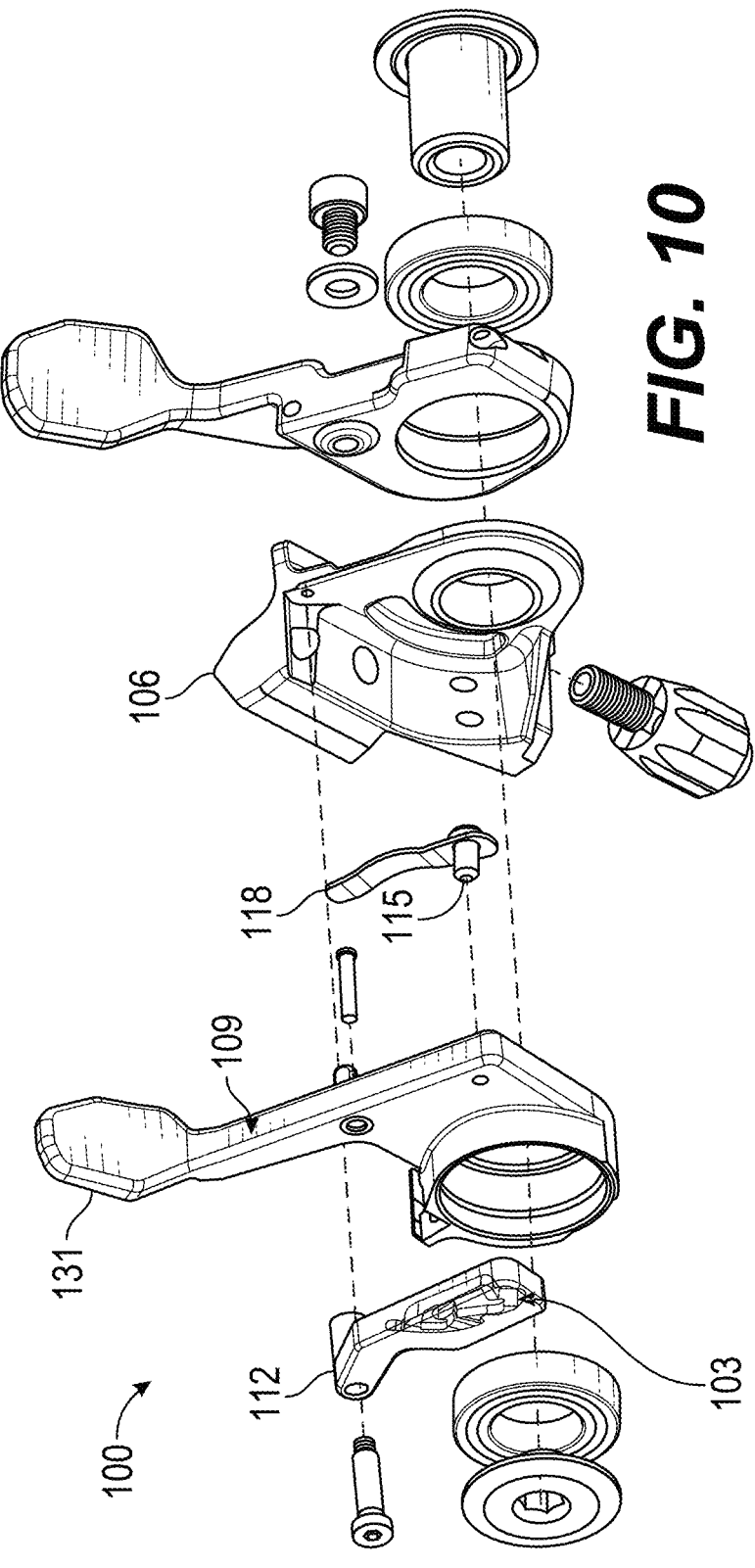
FIG. 10 is an additional exploded view of the lever actuator of FIG. 1 according to various embodiments of the present disclosure.

The multi-position track 103 of the lever actuator 100 can be disposed in or on either the lever 109 or the frame 106 in various embodiments. In some embodiments, however, the multi-position track 103 can be disposed in a follower arm 112, as shown in FIG. 10. In the embodiment of FIGS. 2A, 2B, and 4-7, for example, the multi-position track 103 is disposed in the lever 109. However, in the embodiment of FIG. 8, the multi-position track 103 is disposed in the frame 106.

The multi-position track 103 can be at least partially nested in an inner surface of one of the frame 106 and the lever 109, as shown in FIG. 2B, where at least a portion of a body 103a of the multi-position track 103 extends from the inner surface. Referring collectively again to FIGS. 1-6, the lever actuator 100 can further include a follower portion (e.g., the follower arm 112), a track pin 115, and a biasing element 118, as well as other components that will be described.

Referring to FIG. 2B, the track pin 115 is positioned within a channel 119 of the multi-position track 103, as will be described. The channel 119 may be a continuous channel, thereby allowing the track pin 115 to continuously move among positions within the multi-position track 103. For instance, the track pin 115 can include an elongated member that is movably disposed in the channel 119. The track pin 115 can be biased towards the multi-position track 103 using suitable biasing means, where, in some implementations, the biasing means includes the biasing element 118. As shown in FIG. 2B, the biasing element 118 can include a cantile-vered spring steel biasing element affixed to the lever 109 using a bolt 120, a screw, or other suitable coupling element, although other biasing mechanisms can be employed. A pivoting of the lever 109 causes the track pin 115 to move or advance through the multi-position track 103 as force is applied thereto.

Moreover, the lever actuator 100 can be coupled to at least one suspension cable (not shown), such as a stainless steel cable or like cable. The suspension cable can couple the lever actuator 100 to a suspension system of the bicycle, although the cable can couple the lever actuator 100 to other systems similar to suspension systems. For instance, a first end of a cable can be coupled to the lever actuator 100 (and, more specifically, the lever 109) and a second end of the cable can be coupled to a fork, shock, gear, or other component. The frame 106 can be mounted to a body of a bicycle, such as a handlebar. Thus, a manipulation of the lever 109 causes the lever 109 to pivot relative to the frame 106 about axis $A_1$ which, in turn, causes the cable to translate. The translation of the cable causes a suspension system, a gearing system, etc. of the bicycle to actuate or otherwise adjust, as can be appreciated. In some examples, the translation of the cable can cause a fork, shock, or other suspension component to actuate which, in turn, adjusts the suspension settings of the bicycle or other vehicle.

In a two-position suspension controller, for example, a manipulation of the lever 109 adjusts the position of the cables between two positions in which the cable is translated at two predetermined differing amounts. The cable thereby interacts with or actuates the forks, the shocks, and other components of the suspension system, and the lever actuator 100 can thus be mounted on the under-side of a handlebar on the left, above the handlebar on the right, and so forth. To translate the cable, the lever 109 may rotate or otherwise pivot about the handlebar and the frame 106.

In a three-position suspension controller, for instance, a manipulation of the lever 109 adjusts the position of the cables between three positions in which the cable is trans-lated at three predetermined differing amounts. The cable thereby interacts with or actuates the forks, the shocks, and other components of the suspension system. Again, to trans-late the cable among the different amounts of translation, the lever 109 may rotate or otherwise pivot about the handlebar and the frame 106.

The lever 109 may be nested within two sections of the frame 106, where only a first section of the frame 106 is shown for explanatory purposes. In other words, a second section of the frame 106 is omitted from FIG. 2B for explanatory purposes. A portion of the lever 109 may extend from outside of the frame 106 such that the operator can interact with the contact portion 131 to manipulate the lever 109. The lever 109 includes a body section 153 having an aperture 156, where a bushing 159, a circular elongated member, or like device is positioned therein such that the lever 109 can pivot about the bushing 159 and axis $A_1$ while being secured to the frame 106.

The body section 153 of the lever can include a projecting section 162 positioned proximate to the pivoting point (e.g., the aperture 156 and the bushing 159). The projecting section 162 can extend over the multi-position track 103 and/or the channels 119 thereof. The projecting section 162 can include a recessed section 165 having biasing means stored therein. For instance, the recessed section 165 can include the biasing element 118. The biasing element 118 can be secured to the recessed section 165 via the bolt 120, which is positioned on a first distal end of the biasing element 118 in some implementations. A second distal end of the biasing element 118, opposite that of the first distal end, can include the track pin 115, which can extend through an aperture of the biasing element 118 into the multi-position track 103. The biasing element 118 biases the track pin 115 to a surface of the channel 119 of the multi-position track 103. As such, a rotation of the lever 109 about axis $A_1$ causes the track pin 115 to navigate the channel 119 of the multi-position track 103, as will be described.

Referring to FIG. 2B and FIG. 3 collectively, the multi-position track 103 can include a continuous track, also referred to as a "maze," that can be disposed or recessed in the frame 106 or the lever 109. The multi-position track 103 can be continuous in various implementations, meaning the track pin 115 can continuously advance within the multi-position track 103 regardless of location, as denoted by the arrows shown in the channel 119, referred to herein as a continuous channel direction. In some implementations, the channel 119 of the multi-position track 103 ultimately includes a first end of the multi-position track 103 that can be coupled to a second end thereof, potentially forming a circular- or ovular-shape, a figure-eight-shape, and so forth. It is understood, however, that other shapes can be employed, such as a V-shape, a square shape, a rectangular shape, a triangular shape, and so forth.

Figure 9:
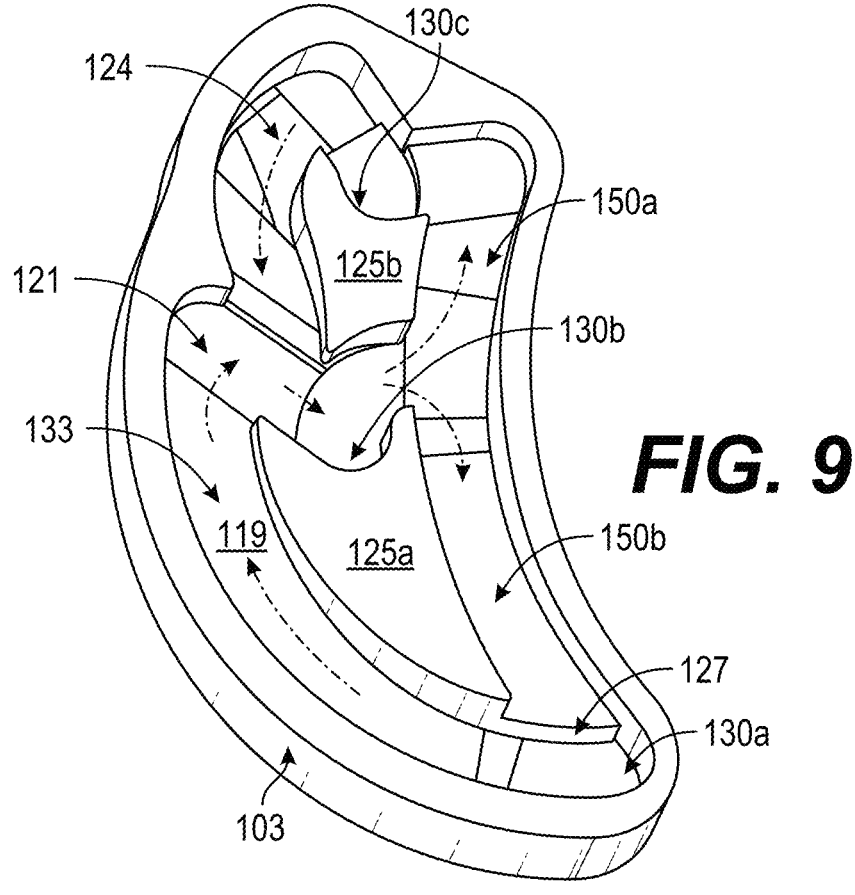
FIG. 9 is a perspective view of a multi-position track according to various embodiments of the present disclosure.

In the example of FIG. 3 and FIG. 9, the multi-position track 103 includes a first loop 121 and a second loop 124 nested within a planar surface of the multi-position track 103, but the disclosure is not so limited and other numbers of loops can be employed. The first loop 121 and the second loop 124 can be defined by two central projections 125a, 125b extending from a bottom surface of the channels 119. The multi-position track 103 can include a multitude of ledges 127 positioned therein, which can include projections extending from an interior surface of the multi-position track 103 such that there are a number of descents in the channels 119. The ledges 127 can define or be positioned proximate to a multitude of discrete track positions 130a, 130b, and 130c (collectively "discrete track positions 130"), which can be further defined by pockets formed in sidewalls of the central projections 125 (e.g., second discrete track position 130b and third discrete track position 130c) and/or at a bottom-most end of the channel 119 (e.g., first discrete track position 130a). The discrete track positions 130a, 130b, and 130c can be points of equilibrium for the track pin 115, as will be discussed. For instance, the track pin 115 can be retained at the discrete track positions 130a, 130b, and 130c until the lever 109 is further manipulated by the rider.

The follower arm 112 can coupled to the frame 106 by the way of a pivot and the lever 109 by way of the track pin 115. In other words, a first end of the follower arm 112 can be pivotably coupled to the frame 106 or the lever 109, and a second opposite end of the follower arm 112 can be posi-tioned above or otherwise proximate to the multi-position track 103, where the second end of the follower arm 112 is freely movable relative to the multi-position track 103 by virtue of the track pin 115 positioned therethrough. The lever 109 can include a contact portion 131 configured to be operated or manipulated by a user, which can extend from or project beyond the frame 106. The contact portion 131 can be ergonomically contoured for manipulation by a hand, thumb, foot, or other desired body part, for instance, in situations in which the lever actuator 100 is mounted to a handlebar or other portion of a bicycle, and can include a ridged surface for friction during strenuous activity.

The multi-position track 103 can include ramps 133 or angled surfaces between individual ones of the ledges 127.

As the multi-position track 103 can be recessed in a surface 136, the multi-position track 103 can have a certain depth. The ramps 133 can have a gentle slope (e.g., less than 80°) to facilitate movement between different discrete track positions 130 without requiring substantial force to be imposed on the lever 109. The ramps 133 permit a depth to be preserved at a fairly constant level within the Z range on the track pin 115.

As noted above, the track pin 115 is movable within the multi-position track 103. For instance, upon a manipulation of the lever 109 (e.g., by applying force thereto), the track pin 115 is forced to advance among the discrete track positions 130 by sliding along ramps 133 until the track pin 115 drops over a ledge 127, which nests the track pin 115 within a pocket or other location defining a discrete track position 130. It is understood that, after the track pin 115 drops over a ledge 127, the track pin 115 is now on a lower plane, and the ledge 127 prevents the track pin 115 from retreating along the path in which the track pin 115 previously advanced. To this end, the ledges 127 are configured such that the track pin 115, which has a force applied thereto in a Z direction, can only move across the ledges 127 in the first direction $D_1$. The Z direction can include the direction perpendicular to the plane of the multi-position track 103.

The biasing element 118 for the track pin 115, for example, can apply force against the track pin 115 in the Z direction. The biasing element 118 can include a spring, a spring steel band, a cantilevered flexing material, and so forth. Thus, due to the biasing of the track pin 115, the ledges 127 can only be crossed by the track pin 115 in the first direction $D_1$ or, in other words, the directions denoted by the arrows in FIG. 3. The ledges 127 and the slope of the ramps 133 prevent the track pin 115 from moving in a direction opposite that of the first direction $D_1$.

In various embodiments, the multi-position track 103 is defined such that there are three discrete track positions 130 (i.e., three points of equilibrium), although other numbers of discrete track positions 130 can be employed including, but not limited to, two positions, four positions, five positions, and so forth. Tension imposed by a suspension cable (not shown) or other external force can pull the track pin 115 in a second direction $D_2$ opposite that of the first direction $D_1$ (e.g., to the left in FIG. 3). Pushing or other manual adjustment of the lever 109 will push the track pin 115 in the first direction $D_1$ (e.g., to the right in FIG. 3) or substantially along the channel 119.

As can be seen, if the lever 109 is pushed far enough, the track pin 115 will drop or otherwise move over a respective ledge 127 and advance to the next discrete track position 130 (e.g., the first discrete track position 130*a* to the second discrete track position 130*b*, the second discrete track position 130*b* to the third discrete track position 130*c*, and so forth). In some implementations, a first subset of the ramps 133 can have a ramp length that is less than that of a second subset of the ramps 133. If the track pin 115 is already in the second discrete track position 130*b* or the third discrete track position 130*c*, a push of a shorter distance of the lever 109 will release the track pin 115 back down a position (e.g., the third discrete track position 130*c* to the second discrete track position 130*b*, the second discrete track position 130*b* to the first discrete track position 130*a*, and so forth).

In other words, a first amount of displacement applied to the lever 109 or the contact portion 131 thereof is used to advance the track pin 115 between a second discrete track position 130*b* and a third discrete track position 130*c*, and a second amount of displacement is used to advance the track pin 115 between a second discrete track position 130*b* and the first discrete track position 130*a*, where the second amount of displacement is less than the first amount of displacement. The amount of displacement can include amounts of pivot of the lever 109 relative to the frame 106, about axis $A_1$, for example.

As such, force can be applied to the contact portion 131 of the lever 109 which causes the track pin 115 to advance among a respective one of the ledges 127 to a subsequent discrete track position 130 in a first direction $D_1$. According to various embodiments, the lever actuator 100 can be part of a handlebar of a bicycle, a dirt bike, a motorcycle, or a powered vehicle, and can be used to adjust gears and perform other desired functions.

The multi-position track 103 can include a bottom mounting portion 140 integral with a body of the multi-position track 103. The bottom mounting portion 140 can include an aperture 143. An axle 146 can be positioned through the aperture 143 and coupled to the frame 106, which provides retention of the follower arm or the multi position track 103 to the respective frame (e.g., frame 106), depending on the desired implementation. Further, the multi-position track 103 can be nested within a surface, for instance, in a correspondingly sized and positioned recess of the frame 106 or lever 109. In some implementations, the multi-position track 103 is formed of a single piece of material (e.g., a stainless steel block) and the channel 119, ramps 133, and ledges 127 can be milled, etched, or otherwise formed out of the single piece of material. Moreover, the shape of the body 103*a* of the multi-position track 103 can be likewise milled, etched, or otherwise formed out of the single piece of material. Thus, the components of the multi-position track 103 described herein can be integral with one another.

As shown in the example of FIG. 7, the multi-position track 103 can be located in in the dynamic portion (e.g., a surface of the lever 109), with the track pin 115 biased by the biasing element 118 in the follower arm 112. Alternatively, the multi-position track 103 can be in the follower arm 112, as shown in FIG. 10, with the track pin 115 biased by the biasing element 118 in the dynamic portion (e.g., the lever 109), as shown in FIG. 2B.

FIG. 9 shows a perspective view of an embodiment of a multi-position track 103 according to various embodiments. Generally, the track pin 115 can start in the first discrete track position 130*a*. A manipulation of the lever 109 causes the lever 109 to rotate about axis $A_1$. The rotation of the lever 109 causes the track pin 115 (via the follower arm 112) to displace and move along the left side of the multi-position track 103 in the channel 119. The ledge 127 proximate to the first discrete track position 130*a* prevents the track pin 115 from advancing along the right side of the channel 119, as can be appreciated.

The track pin 115 advances up a ramp 133 disposed on the left side of the multi-position track 103 until the track pin 115 drops over a ledge 127. At this point, no further manipulation of the lever 109 is required. As the track pin 115 drops over the ledge 127, the track pin 115 is now on a lower plane 121 relative to the preceding ramp 133. The ledge 127 thus projects above the lower plane 121, preventing the track pin 115 from moving back towards discrete track position 130*a*. Instead, the track pin 115 is advanced, by the return force from the cable tension, into the second discrete track position 130*b*.

Once in the second discrete track position 130*b*, a first amount of displacement caused by manipulation of the lever 109 can cause the track pin 115 to move to a successive one of the discrete track positions 130, namely, the third discrete track position 130*c*. Alternatively, a second amount of displacement, however, caused by manipulation of the lever 109 can cause the track pin 115 to move to a preceding one of the discrete track positions 130 or, in other words, the first discrete track position 130*a*. As such, multiple levers are not required as is customary in such actuators, and an operator can be accustomed to using different degrees of translation or manipulation of the lever 109.

Referring again to the scenario in which the track pin 115 is in the second discrete track position 130*b*, the channel 119 positioned along the right side of the multi-position track 103 includes an up-ramp 150*a*, and a down-ramp 150*b*. A curvature of the up-ramp 150*a* can cause the track pin 115 to move upwards, if sufficient displacement is applied to the lever 109, to until the track pin 115 advances over the top-most ledge 127 into the third discrete track position 130*c*. As can be appreciated, more displacement by the user's thumb must be applied to the lever 109 to force the track pin 115 along the up-ramp 150*a* as compared to an amount of displacement required to advance the track pin 115 along the down-ramp 150*b* towards the first discrete track position 130*a*. Upon release of the pressure (e.g., upon release of pressure applied by a user's thumb), the cable tension bias will advance the track pin 115 down ramp 150*b* to discrete track position 150*a* if the pin has not advanced over the top-most ledge 127. The cable tension can pull the track pin 115 in a direction opposite that of a movement direction of the contact portion 131 of the lever 106.

While FIG. 9 depicts a multi-position track 103 with three discrete track positions 130*a* . . . 130*c*, the disclosure is not so limited. It is understood that the multi-position track 103 can be defined such that there are four, five, and six discrete track positions, and even more without deviating from the principals of the present disclosure. It is further understood that different amounts of force applied to the lever 109 can cause the track pin 115 to advance to one of two or more subsequent discrete track positions 130. Alternatively, different amounts of displacement applied to the lever 109 can cause the track pin 115 to advance to a subsequent discrete track position 130 or advance to a prior discrete track position 130, such as shown in FIG. 9.

With reference again to the second discrete track position 130*b*, the multi-position track 103 has an up-ramp 150*a* positioned proximate to the second discrete track position 130*b*. The up-ramp 150*a* guides the track pin 115 to a third discrete track position 130*c*. Conversely, a down-ramp 150*b* is also positioned proximate to the second discrete track position 130*b*. The down-ramp 150*b* guides the track pin 115 to the first discrete track position 130*a*. A first one of the ledges 127 can be positioned at a bottom end of the down-ramp 150*b* that advances the track pin 115 to the first discrete track position 130*a*. Similarly, a second one of the ledges positioned at a top end of the up-ramp 150*a* advances the track pin to the third discrete track position 130*c*.

The multi-position track 103 of FIG. 9 includes two central projections 125*a*, 125*b*. However, the multi-position track 103 can include one or more central projections. The discrete track positions 130 can include pockets formed in a sidewall of at least one central projections 125.

By virtue of the track pin 115 being in respective ones of the discrete track positions 130, a cable coupled to the lever actuator 100 can be subjected to different degrees of translation. For instance, when the track pin 115 is in the first discrete track position 130*a*, a first amount of translation (or no translation) can be imposed on a cable, when the track pin 115 is in the second discrete track position 130*b*, a second amount of translation can be imposed on the cable, when the track pin 115 is in the third discrete track position 130*c*, a third amount of translation can be imposed on the cable, and so forth. Different amounts of translation on the cable can cause different levels of actuation of a suspension system, gearing system, or other desired system, which can affect the characteristics or settings of the vehicle.

As such, in some embodiments, the multi-position track 103 can be used to toggle between three suspension settings by actuating a shock, fork, or like device, while only requiring the operator to manipulate the lever 109 in a single direction. First instance, a first push on the lever 109 can change the vehicle from a first ride setting to a second ride setting, a second push on the lever 109 can change the vehicle from the second ride setting to a third ride setting, and a third push on the lever 109 can change the vehicle from the third ride settings back to the first ride setting. However, it is understood that additional discrete track positions 130 can be provided to accommodate additional ride settings.

The features, structures, or characteristics described above may be combined in one or more embodiments in any suitable manner, and the features discussed in the various embodiments may be interchangeable, if possible. In the following description, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims.

The terms "first," "second," etc. are used only as labels, rather than a limitation for a number of the objects. It is understood that if multiple components are shown, the components may be referred to as a "first" component, a "second" component, and so forth, to the extent applicable.

The above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A lever actuator, comprising:
a frame;
a lever movably coupled to the frame, the lever comprising a contact portion;
a follower arm movably coupled to one of the frame and the lever;
a multi-position track disposed in one of the lever, the follower arm, and the frame, the multi-position track comprising a continuous channel having a plurality of ledges with a plurality of ramps positioned therebetween the continuous channel having a plurality of discrete track positions; and
a track pin coupled to the multi-position track by way of one of the follower arm, the frame, and the lever, wherein the track pin is movable within the multi-position track,
wherein a displacement applied to the contact portion of the lever relative to the frame causes the track pin to advance in the multi-position track to a respective ledge among the ledges and a subsequent discrete track position in a continuous channel direction.

2. The lever actuator according to claim 1, further comprising a biasing element for the track pin that applies force in a direction perpendicular to a plane of the multi-position track.

3. The lever actuator according to claim 2, wherein the biasing element comprises a spring.

4. The lever actuator according to claim 1, wherein the multi-position track is at least partially recessed in the frame or the lever.

5. The lever actuator according to claim 1, wherein the multi-position track is at least partially recessed in the follower arm.

6. The lever actuator according to claim 1, wherein cable tension pulls the track pin in a direction opposite that of a movement direction of the contact portion of the lever.

7. The lever actuator according to claim 1, wherein the multi-position track comprises at least a first loop and a second loop.

8. The lever actuator according to claim 1, wherein the plurality of ledges are raised from a planar surface that prevents movement of the track pin in a reverse direction opposite that of the continuous channel direction.

9. The lever actuator according to claim 1, wherein the lever actuator is affixed to a handlebar of a bicycle, a dirt bike, a motorcycle, or a powered vehicle.

10. The lever actuator according to claim 1, wherein a number of the discrete track positions comprises three, four, five, or six.

11. The lever actuator according to claim 1, wherein a first amount of displacement is required to advance the track pin between a first one of the discrete track positions and a second one of the track positions, and a second amount of displacement is required to advance the track pin between a first one of the discrete track positions and a third one of the discrete track positions, the second amount of displacement being less than the first amount of displacement.

12. A lever actuator, comprising:
a static portion, a dynamic portion movably coupled to the static portion, and a follower portion that is coupled to both the static portion and dynamic portion;
a multi-position track disposed in one of the static portion, the dynamic portion, and the follower portion, the multi-position track comprising a plurality of ledges defining a plurality of discrete track positions, the multi-position track comprising a plurality of ramps positioned between the plurality of ledges; and
a track pin movable within and biased against the multi-position track,
wherein a first amount of displacement caused by manipulation of the dynamic portion causes the track pin to move to a subsequent one of the discrete track positions, and a second amount of displacement caused by manipulation of the dynamic portion causes the track pin to move to a preceding one of the discrete track positions.

13. The lever actuator of claim 12, wherein the static portion comprises a frame, the dynamic portion comprises a lever, and the follower portion comprises a follower arm movably coupled to the frame and the lever by way of the track pin as positioned in the multi-position track.

14. The lever actuator according to claim 12, further comprising a biasing element for the track pin that biases the track pin in a Z direction perpendicular to a plane of the multi-position track, wherein the biasing element is a spring.

15. The lever actuator according to claim 12, wherein the multi-position track comprises a first one of the plurality of ramps positioned proximate to a second one of the discrete track positions that guides the track pin to a third one of the discrete track positions.

16. The lever actuator according to claim 15, wherein the multi-position track further comprises a second one of the plurality of ramps positioned proximate to the second one of the discrete track positions that guides the track pin to a first one of the discrete track positions.

17. The lever actuator according to claim 15, further comprising a first one of the ledges positioned at a bottom end of the ramp that advances the track pin to the first one of the discrete track positions, and a second one of the ledges positioned at a top end of the ramp that advances the track pin to the third one of the discrete track positions.

18. The lever actuator according to claim 17, further comprising at least one central projection enclosed by the channel of the multi-position track, at least one of the discrete track positions being a pocket formed in a sidewall of the at least one central projection.

19. A lever actuator, comprising:
a frame;
a lever movably coupled to the frame, the lever comprising a contact portion;
a follower arm movably coupled to one of the frame and the lever;
a multi-position track disposed in one of the lever, the follower arm, and the frame, the multi-position track comprising a continuous channel having a plurality of ledges defining a plurality of discrete track positions, and the multi-position track comprising at least a first loop and a second loop; and
a track pin coupled to the multi-position track by way of one of the follower arm, the frame, and the lever, wherein the track pin is movable within the multi-position track,
wherein a displacement applied to the contact portion of the lever relative to the frame causes the track pin to advance in the multi-position track to a respective ledge among the ledges and a subsequent discrete track position in a continuous channel direction.

20. The lever actuator according to claim 19, wherein the lever actuator is affixed to a handlebar of a bicycle, a dirt bike, a motorcycle, or a powered vehicle.

* * * * *